June 22, 1937. M. V. ZAUSTINSKY 2,084,787
METHOD AND APPARATUS FOR VENTILATING AN ENCLOSED SPACE
Filed Feb. 21, 1934
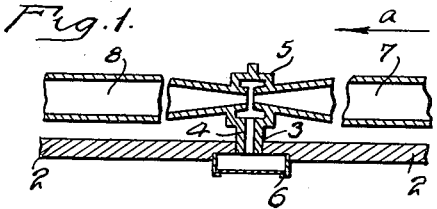
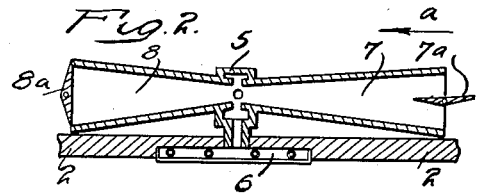
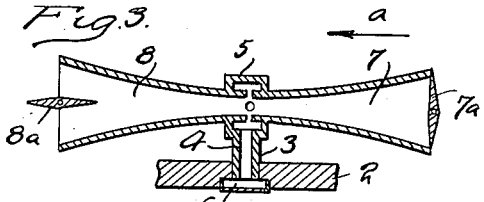
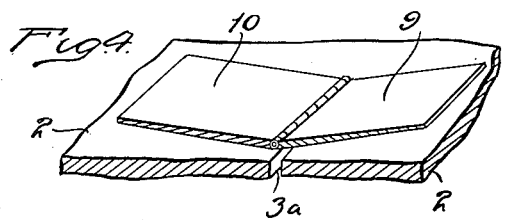
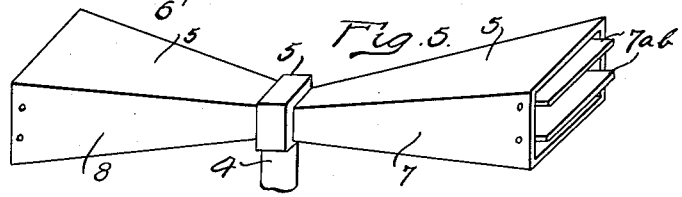
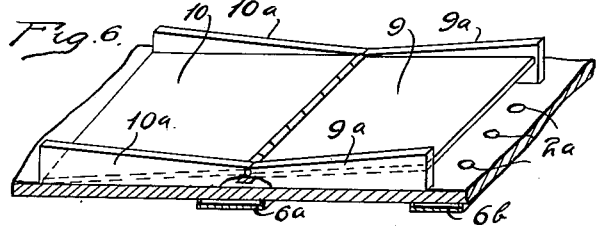
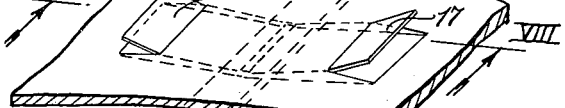
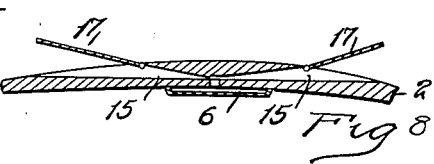
INVENTOR.
MICHAEL V. ZAUSTINSKY.
BY
ATTORNEY.

Patented June 22, 1937

2,084,787

UNITED STATES PATENT OFFICE 2,084,787

METHOD AND APPARATUS FOR VENTILATING AN ENCLOSED SPACE

Michael V. Zaustinsky, Battle Creek, Mich.

Application February 21, 1934, Serial No. 712,278

1 Claim. (Cl. 98—2)

My invention relates to a method and apparatus for excluding carbon-monoxide or other injurious gases from the interior of automobile bodies and for supplying pure air thereto, and incidentally to free such air of any foreign matter that may be borne in it and prevent objectionable drafts.

While I contemplate any kind of enclosure I will describe my invention particularly with reference to an automobile.

In the accompanying drawing:—

Figure 1 is a detail section showing a part of the top of an automobile and an apparatus embodying my invention attached thereto.

Figure 2 is a view similar to Figure 1, showing controlling means.

Figure 3 is a view similar to Figure 2, having somewhat differently formed walls and the valves, or controlling means, differently arranged.

Figure 4 is a modified construction embodying my invention and shown in section and perspective.

Figure 5 is a perspective view of a construction similar to Figure 2, but having a different kind of valve or controlling means.

Figure 6 is a view, similar to Figure 4, but having a side wall at the edges of the pivoted leaves.

Figure 7 is a detail perspective view of a part of the top of an automobile showing a construction embodying my invention.

Figure 8 is a section on the line VIII, VIII, Fig. 7.

Figure 9 is a detail section showing a still different form of construction embodying my invention.

Figure 10 is a detail section showing a method of adjusting a filtering and distributing means.

2, 2 indicates a portion of the top of an automobile having an aperture 3 therethrough.

Referring particularly to Figures 1, 2, 3, and 5. 4 is a tube fitting into the aperture 3 and having, at its upper end, a box-like construction 5, into which the tube 3 opens. 6 is a receptacle constructed to constitute a filler and distributor located at the lower end of the tube 4. 7 and 8 are tapering passages arranged axially in line with each other and having their smaller ends adjacent, but somewhat spaced from each other, in the enlargement 5.

Apertures are formed at their smallest diameter opening through their walls into the enlargement 5. 7a and 8a (Figs. 2 and 3) are valves adapted to control the entrance or exits of the passages 7 and 8, and 7ab in Figure 5 indicates a double valve at the entrance or exit from the passage 7. That is to say:—

The receptacle 6 has a considerable extent horizontally and its lower wall is of a material that will act as a filter to cleanse and distribute the air passing through it and may be of a suitable textile material.

The operation of the above described apparatus is as follows:—

The motion of the air relative to the automobile or other enclosure is indicated by the arrows $a$, in the construction of Figures 1, 2, 3, and 5. The contraction of the passages 7 and 8 (Fig. 1) within the enclosure 5, will, if required, produce a suction on the principle of the Venturi tube, and the air will be drawn from the enclosure through the tube 4, and lower wall of the receptacle 6 displacing the dust that may have gathered thereon.

If the valve 8a be closed and the valve 7a opened, as shown in Figure 2, then the inertia of the air will cause a rise of pressure in the passages 7 and 8 forcing air into the enclosure 5, which will pass down through the tube 4 and through the filter of the receptacle 6 and be cleaned thereby, and distributed throughout the space of the enclosure, without producing any objectionable draft. In this way the pressure of the air in the enclosure 5 of the automobile body will be above that of the atmosphere and the engine gases can not enter.

In Figure 4, I have substituted two leaves, 9 and 10, which are hinged together at their adjacent ends and these ends are located directly above a slot 6a in the roof. These leaves may be adjusted to any angle required relative to the roof 2, 2 of the automobile, and the space beneath said leaves will form converging passages analogous to 7 and 8. In Figure 6, I have shown similar leaves 9 and 10 that are provided with side walls 9a and 10a to complete the converging passages. The leaves may be adjusted to any desired angle to the air current to secure the objects above specified.

When the apparatus is used to draw the air from the enclosure one or more supply passages 2a are provided through the roof to supply air to the enclosure and this air may be led through a filter 6b.

In Figures 7 and 8 similarly formed passages having converging walls to those of Figures 1 to 3, are shown and there are similar valves 17 at both entrance and exit openings, and a filtering and distributing means is provided at 6.

In Figure 9 a shell is placed upon the top 2, which forms two similar passages 7 and 8 in connection with the wall 2 of the enclosure and there are valves 7a and 8a to control the openings to said shell and there is a filtering and distributing apparatus 6 below the aperture 3 passing through the wall of the enclosure at the narrow portion of the passage through the shell.

Figure 10 indicates the means that may be provided for attaching a filter below an opening 3 consisting of a stamping 18 which may be attached to the wall of the enclosure and be provided with a filling-rod 19 around which the filtering sheet may be wrapped at its edge.

It will be observed that with this apparatus air is circulated all over the car and not only around the windows, and that fresh air is continually brought into the enclosure, that the dust may be thoroughly removed and that no drafts are occasioned.

The apparatus is cheap to construct and may be easily built into a wall of the car.

What I claim is:—

The combination with an automobile having an enclosed body and an engine, a passage on said body opening at one end against the relative current of air when the automobile is in motion and at the other end in the direction of said current, a second passage opening into the first mentioned passage intermediate said ends and into said body, an enclosed chamber having a filtering and distributing wall at the inner end of said second passage, and means for closing one or the other ends of said first mentioned passage at will, whereby a plenum of filtered air is created in said body and whereby the accumulated dust on the inner surface of said wall is removed.

MICHAEL V. ZAUSTINSKY.